US011416835B2

(12) United States Patent
Monaghan

(10) Patent No.: US 11,416,835 B2
(45) Date of Patent: Aug. 16, 2022

(54) AUTOMATED ENTERPRISE BOT

(71) Applicant: NCR Corporation, Duluth, GA (US)

(72) Inventor: Andrew David Monaghan, Dundee (GB)

(73) Assignee: NCR Corporation, Atlanta, GA (US)

( * ) Notice: Subject to any disclaimer, the term of this patent is extended or adjusted under 35 U.S.C. 154(b) by 830 days.

(21) Appl. No.: 15/714,732

(22) Filed: Sep. 25, 2017

(65) Prior Publication Data

US 2019/0095888 A1 Mar. 28, 2019

(51) Int. Cl.
*G06Q 20/10* (2012.01)
*G06N 7/00* (2006.01)
*G06N 20/00* (2019.01)

(52) U.S. Cl.
CPC ......... *G06Q 20/1085* (2013.01); *G06N 7/005* (2013.01); *G06N 20/00* (2019.01)

(58) Field of Classification Search
CPC .......... G06Q 20/00; G06N 20/00; G07N 7/00; G07F 19/209
See application file for complete search history.

(56) References Cited

U.S. PATENT DOCUMENTS 7,039,654 B1 * 5/2006 Eder ...................... G06Q 10/06
7,765,121 B2 * 7/2010 Pace ................ G06Q 10/06311 705/7.13
9,818,126 B1 * 11/2017 Faith .................. G06Q 30/0201
2006/0010027 A1 * 1/2006 Redman ........... G06Q 10/06375 705/7.16
2008/0018738 A1 * 1/2008 Lipton ............... G08B 13/1968 348/143
2008/0074496 A1 * 3/2008 Venetianer ....... G08B 13/19602 348/150
2009/0089108 A1 * 4/2009 Angell ................... G06Q 10/00 705/7.28
2012/0320199 A1 * 12/2012 Kundu ................ G06Q 20/208 348/143
2013/0320091 A1 * 12/2013 Detwiler ............. G07G 1/0045 235/462.11
2014/0257914 A1 * 9/2014 Calman .............. G06Q 10/0633 705/7.27
2015/0206081 A1 * 7/2015 Lee ........................ G06Q 10/06 705/7.13

(Continued)

FOREIGN PATENT DOCUMENTS

JP 2009543191 * 5/2009

OTHER PUBLICATIONS

Harrison, H. C., and Gong Qizhong. "An intelligent business forecasting system." Proceedings of the 1993 ACM conference on Computer science. 1993. (Year: 1993).*

(Continued)

*Primary Examiner* — Patricia H Munson
*Assistant Examiner* — Hamzeh Obaid
(74) *Attorney, Agent, or Firm* — Schwegman, Lundberg & Woessner

(57) ABSTRACT

An autonomous enterprise bot observes video, audio, and operational real-time data for an enterprise. The real-time data is processed and a predicted activity needed for the enterprise is determined. The bot proactively communicates the predicted activity to a staff member of the enterprise for performing actions associated with the predicted activity.

10 Claims, 5 Drawing Sheets

(56) References Cited

U.S. PATENT DOCUMENTS

| | | | | |
|---|---|---|---|---|
| 2015/0350439 A1* | 12/2015 | Holden | ............... | H04M 3/5166<br>379/265.09 |
| 2016/0292011 A1* | 10/2016 | Colson | ............. | G06Q 10/06311 |
| 2017/0186270 A1* | 6/2017 | Acres | .................. | G07F 17/3234 |

OTHER PUBLICATIONS

O. Small, B. (2012). An approach for intention-driven, dialogue-based web search (Order No. MR84418). Available from ProQuest Dissertations and Theses Professional. (1115317906). Retrieved from https://dialog.proquest.com/professional/docview/1115317906?accountid=131444 (Year: 2012).*

* cited by examiner

AUTOMATED ENTERPRISE BOT

BACKGROUND

A typical enterprise has a variety of resources that must be continually managed, such as equipment, supplies, utilities, inventory, staff, space, customers, time, etc. In fact, many enterprises dedicate several staff to manage specific resources or groups of resources.

Enterprises also rely on a variety of software systems for managing resources. Today, most enterprises also include security cameras that are largely only accessed and reviewed by staff when a security issue arises.

Consider a bank branch having several Automated Teller Machines (ATMs), teller stations, offices, specialized staff members, security cameras, servers, and a variety of software systems. During normal business hours the branch also has customers either accessing the ATMs, performing transactions with tellers (at the teller stations), and/or meeting with branch specialists in the offices. The ATMs require media (such as currency, receipt paper, receipt print ink/cartridges) for normal operation. In some circumstances, the ATMs may also require engineers/technicians to service a variety of component devices of the ATM (depository, dispenser, cameras, deskew modules, sensors, receipt printer, encrypted PIN pad, touchscreen, etc.).

The efficiencies in servicing customers is of utmost importance at the branch but in order for this even be possible, the branch equipment must be fully operational and the staff's time appropriately allocated where most needed. The typical branch relies on the staff and/or branch managers to manage the efficiencies. However, there can be a variety of unforeseen circumstances that have not occurred but are likely to occur for which the staff has no way of knowing and which can dramatically adversely impact the branch's efficiencies.

SUMMARY

In various embodiments, methods and a system for an automated enterprise bot are presented.

According to an embodiment, a method for processing an automated enterprise bot is provided. Specifically, and in one embodiment, real-time information that includes at least some real-time video data is obtained from a facility of an enterprise. An activity is determined from the real-time information, and the activity is communicated to the enterprise.

DETAILED DESCRIPTION

Figure 1A:
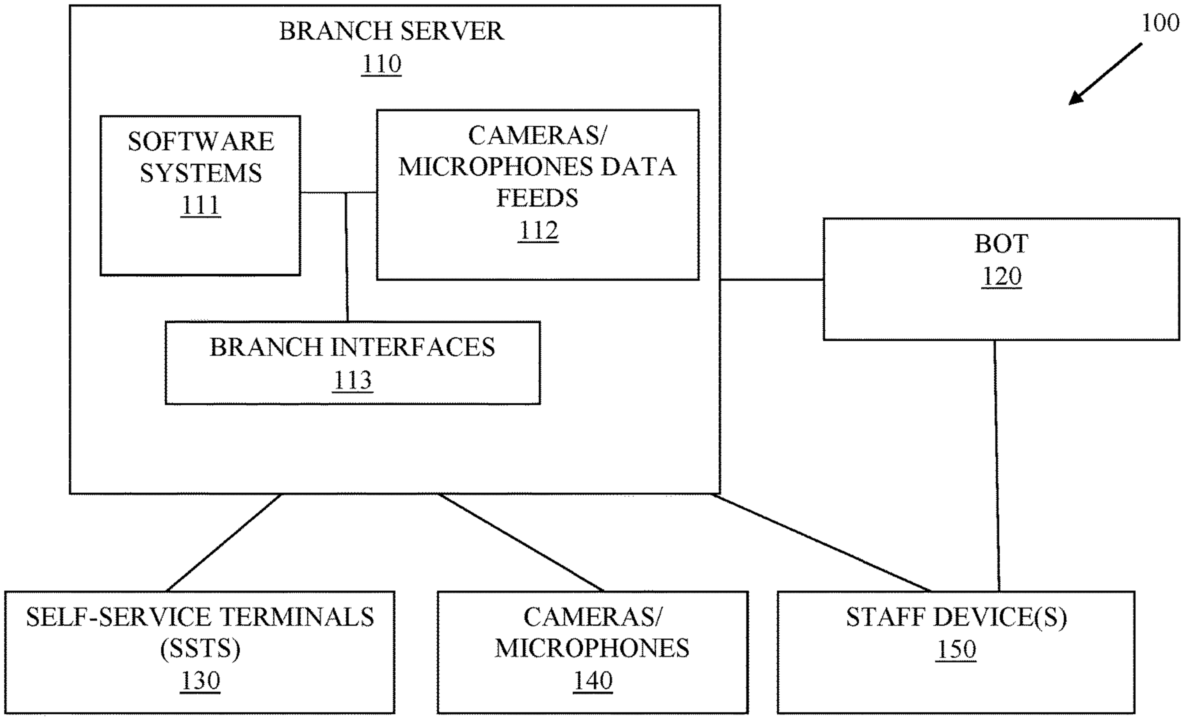
FIG. 1A is a diagram of a system for processing an enterprise bot, according to an example embodiment.

FIG. 1A is a diagram of a system for processing an enterprise bot, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the enterprise bot techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for processing an enterprise can be implemented in all, or some combination of the components shown in different hardware computing devices having one or more hardware processors.

The system 100 includes: a branch server 110 having software systems 111, cameras/microphones data feeds 112 ("data feeds 112"), and a plurality of branch interfaces 113 for accessing the software systems 111. The system also includes Self-Service Terminals (SSTs) 130, cameras/microphones 140, staff devices 150, and an enterprise bot 120 ("bot" 120).

The video/audio feeds 112 are provided from the cameras/microphones 140 as images, video, and audio.

The software systems 111 can include a variety of software applications utilized by the branch. The branch interfaces 113 can include staff-only facing (through the staff devices 150), customer-facing (through the SSTs 130), and automated interfaces through Application Programming Interfaces (APIs) between the server 110 and the SSTs 130 and staff devices 150.

The interfaces 113 collect operational and transactional data that is delivered to the software systems 111 through the interfaces 113, such as but not limited to, metrics with respect to transactions being processed on the SSTs 130 and/or staff devices 150, equipment health (jams, status, etc.) and media requirements (dispensed notes, paper, ink), staff-acquired data (appointments, work calendars, staff present, etc.), branch data (device identifiers, staff identifiers, supplies on hand, customer accounts, device information, inventory of assets, scheduled deliveries of supplies/assets, etc.), and other information. The software systems 111 may also have access to external servers for collecting a variety of information with respect to the other branches of the enterprise.

The bot 120 may reside on the server 110 or may be accessed through an external network connection that is external to the branch. The components of the bot is shown in the FIG. 1B. Processing associated with the bot 120 is described in greater detail below with the FIGS. 1B and 2-4.

The bot 120 receives data streams and information (in real time) from the server including data collected by the software systems 111 and the data feeds 112. The bot 120 also has access to historically collected data for the branch. This data is modeled in a database with date and time stamps and other metadata. The bot 120 is trained for activities associated with the branch.

Training can be done in a variety of manners. For example, tasks are data points (conditions of the SSTs 130, calendar entries, traffic at the branch, staff on hand at the branch, etc.) associated with a given result/activity (replenishing media, scheduling more staff, servicing the SSTs 130, servicing the facilities in some manner, adjusting schedules, etc.). Historical tasks (conditions) associated with operation of the branch (staff, equipment, facilities, customer traffic, etc.) along with the historical results are provided as input during the machine learning training of the bot 120. Patterns in the tasks are derived and weighted (as probabilities (0-1)) with respect to the known results and a function is derived, such that when real-time tasks are observed and provided as input to the bot 120, the bot 120 assigns a probability of a given result that is needed as output.

The bot 120 continues to undergo additional training through feedback (actual results from observed tasks versus the bot 120 predicted result). This allows the bot 120 through machine learning to become more accurate with respect to predicting results from observed tasks, the longer the bot 120 processes.

The bot 120 also keeps track of a variety of results and their competing interests based on priorities assigned to the results (which the bot 120 can also learn through initial configuration and through continual training). For example, a predicted result that indicates twenty dollar notes need replenished soon for a first SST 110 can be delayed when the second SST 110 has more than a predetermined amount of twenty dollar notes when the branch is experiencing heavy traffic or is expecting heavy traffic based on a current date, day of week, and time of day.

The bot 120 also provides a search interface with respect to any of the historically gathered data through natural language processing on speech and text-based searches. Refinement of the search interface can also be achieved as the bot 120 is corrected on search results provided for a given search and learns the speech and dialect of the searchers (staff of the branch).

The bot 120 is proactive in that it makes recommendations to the staff without being queried (without being affirmatively asked) from any staff member with respect to activities/results needed at the branch. Such as, for example, replenishing the media of the SSTs 130, servicing components of the SSTs 130, adjusting schedules, adjusting priorities of activities, and the like. The activities may be viewed as predicted results that have not yet occurred but need to occur based on the observed tasks/conditions of the SSTs 130 for efficiencies of the branch. The tasks/conditions can include current staff and customer schedules, state of the branch through video tracking, metrics and state of the SSTs 130, etc.

The bot 120 can also re-assign an activity (predicted result that needs attending to) between staff members when requested to do so. That is, interaction with the staff permits the staff to override assignment by the bot 120 from one staff member to another staff member. The bot 120 can also set staff-requested reminders for a given activity. For example, a staff member can request that an assigned activity be delayed and that the bot 120 remind the staff member in 15 minutes again. Based on the assigned security role of the staff members, some staff members may not be able to interact with the bot 120 and re-assign a bot-assigned activity. For example, a teller at the branch cannot request that the bot 120 assign cleaning the rest rooms to a branch manager. This bot 120 has access to the assigned security roles of the staff members and acceptable and unacceptable overrides that each can request of the bot 120.

The activities/predicted results require actions on the part of the staff. The bot 120 has access to these actions through the software systems, such that when an activity is assigned, the bot 120 can provide the specific actions that the assigned staff member needs to perform. These actions can be communicated in a variety of manners, such as through images or video on a staff device 150, text messages, and/or speech provided through a microphone of a staff device 150.

The bot 120 provides an automated enterprise assistance manager that continually learns the operation of the branch and maximizes resource utilization of the branch. Additional aspects of the bot are now presented with the discussion of the FIG. 1B.

Figure 1B:
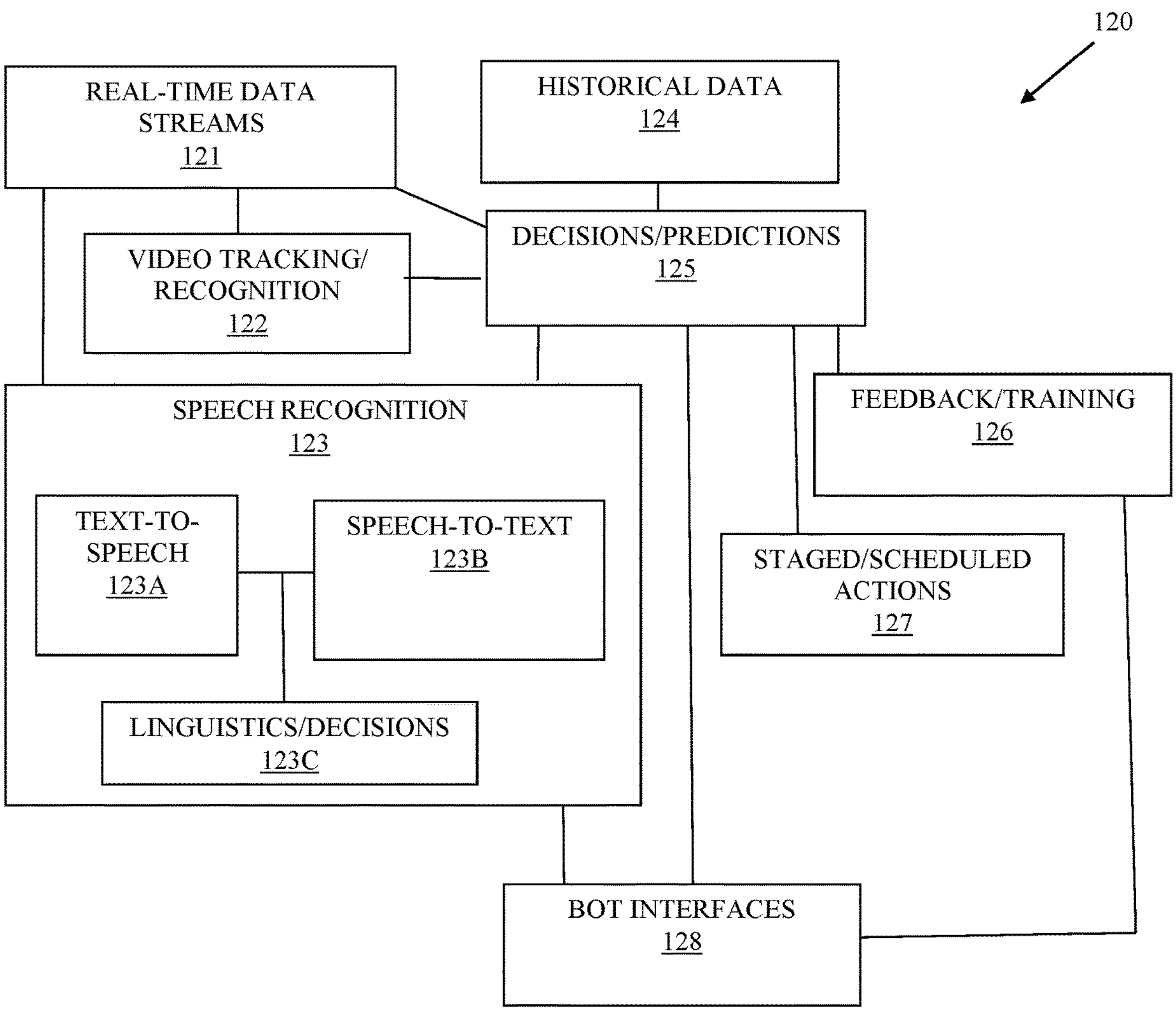
FIG. 1B is a diagram of an enterprise bot, according to an example embodiment.

FIG. 1B is a diagram of an enterprise bot 120, according to an example embodiment. Again, the bot 120 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the bot 120 features discussed herein and below.

In an embodiment, the bot 120 resides and processes on the server 110.

In an embodiment, the bot 120 resides external to the server 110 on a separate server or on a plurality of servers cooperating as a cloud processing environment.

The bot 120 includes real-time data streams 121, video tracking/recognition 122, speech recognition 123 (including text-to-speech 123A, speech-to-text 123B, and linguistic decisions 123C), historical data 124, decisions/predictions 125, feedback/training 126, staged/scheduled actions 127, and a plurality of bot interfaces 128.

The real-time data streams 121 include the video/audio data feeds 112 and operational data being collected by the software systems 111. This information is modeled in a databased and processed for identifying tasks (observed conditions).

To arrive at some of the observed conditions for the video/audio data feeds 112, the bot 120 processes video tracking/recognition algorithms 122 and processes speech recognition 123.

The bot 120 also has access to past observed actions (tasks) through the historical data 124.

The bot 120 includes a machine-learning component as was described above, such that the bot 120 is trained on the tasks (observed conditions) and results (desired activity). The derived function that processes real-time observed actions to predict (based on a probability of 0-1) a desired activity is represented by the decisions/predictions module 125. Machine learning and refinement of the derived function occurs through the feedback/training module 126. The predicted activities are linked to actions that are needed to perform those activities (as was discussed above), lower priority, overridden, and schedules activities and their pending actions are shown as the staged/scheduled actions 127.

The bot interfaces 128 include APIs for automated interaction with APIs of the software systems 111 and for dynamic interaction through a variety of messaging platforms, such as interactive natural language speech, Short Message Service (SMS) texts, emails, instant messaging, social media messages, and the like.

The staff can initiate a session/dialogue with the bot 120 through a messaging platform interface 128 or through an existing interface associated with the software systems 111. The staff can perform natural language requests or can interact with the bot 120 for overrides or re-assignment of activities. For example, a staff can speak in a microphone and ask the bot interface 121 "who was the last staff member to service one of the SSTs 130." In response, the bot 120 identifies the staff member though the historical data 124 and provides an answer in speech back to the staff member through the speakers of a staff device 150. In some cases, the actual recorded video of the staff member that last service the SST 130 can be played through the interface 128 on the staff device 150 for viewing by the requesting staff member. Staff can also adjust their work calendars through natural language interaction with the bot 120.

The bot 120 also proactively and dynamically interacts and initiates a dialogue with the staff through the staff devices 150 to communicate needed activities (which are predicted activities need to manage the branch). This is not prompted by the staff and is communicated when a predicted activity has exceeded a predefined threshold (0-1) indicating that it is necessary for the activity and its actions be performed by the staff.

In an embodiment, the bot 120 is configured with skills, these skills provide configured integration with difference aspects of the software systems 110, such as calendar adjustments, work schedules, customer account information to assist staff with specifics of customer accounts, and the like.

In an embodiment, at least one bot interface 128 is provided through a network-voice enabled Internet-Of-Things (IoTs) appliance.

In an embodiment, at least one bot interface 128 is provided for interaction with an existing IoT appliance, such as Amazon Echo®, Google Home®, Apple Siri®, etc.

In an embodiment, the SST is an ATM.

In an embodiment, the SST is a kiosk.

In an embodiment, some processing associated with the bot 120 may be exposed and made available to customers at the SST 130.

In an embodiment, the staff devices is one or more of: a desktop computer, a laptop computer, a phone, a wearable processing device, and an IoT device.

These and other embodiments are now discussed with reference to the FIGS. 2-4.

Figure 2:
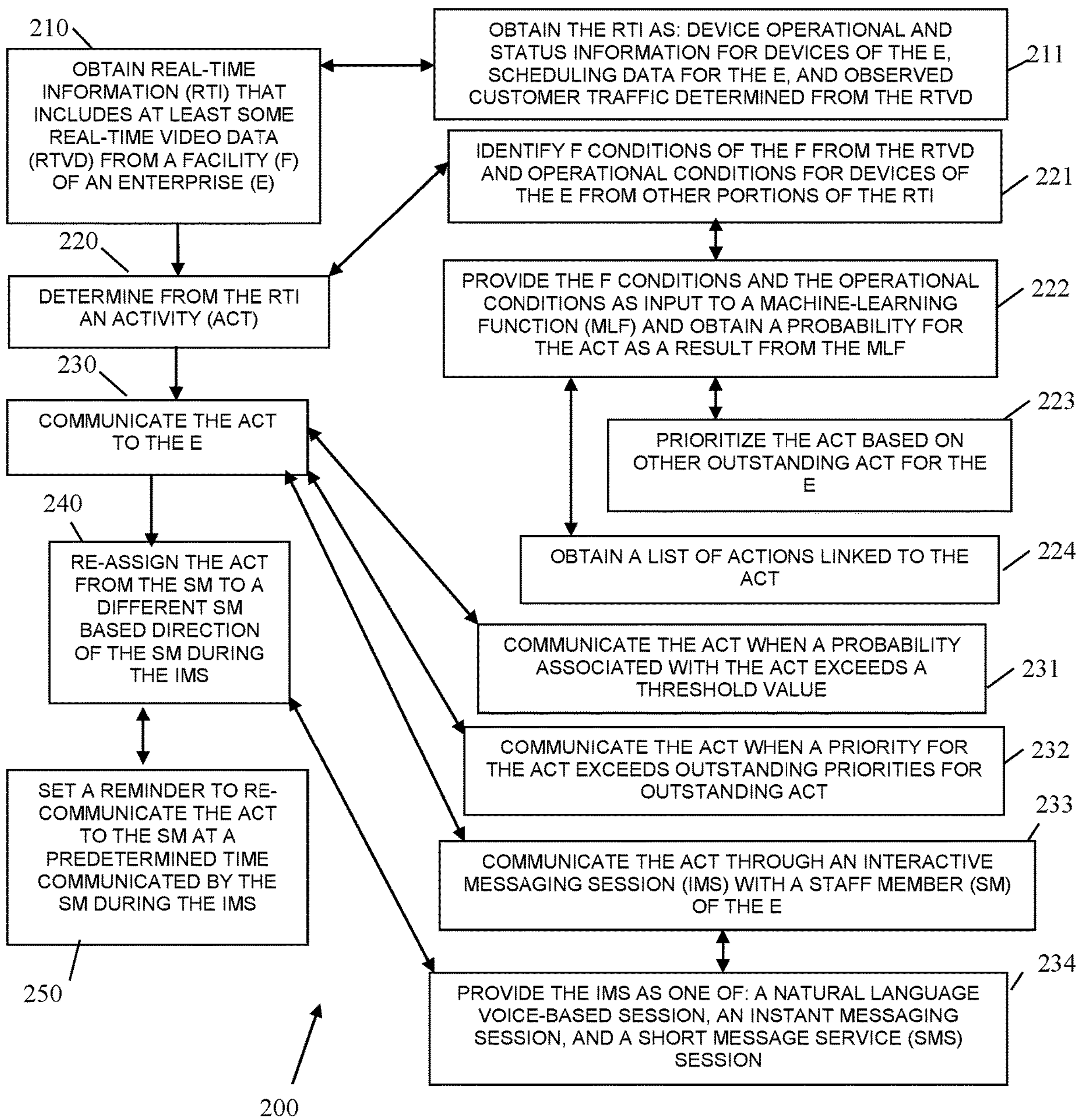
FIG. 2 is a diagram of a method for processing an enterprise bot, according to an example embodiment.

FIG. 2 is a diagram of a method 200 for processing an enterprise bot, according to an example embodiment. The software module(s) that implements the method 200 is referred to as an "autonomous enterprise bot." The autonomous enterprise bot is implemented as executable instructions programmed and residing within memory and/or a non-transitory computer-readable (processor-readable) storage medium and executed by one or more hardware processors of a hardware computing device. The processors of the device that executes the autonomous enterprise bot are specifically configured and programmed to process the autonomous enterprise bot. The autonomous enterprise bot has access to one or more networks during its processing. The networks can be wired, wireless, or a combination of wired and wireless.

In an embodiment, the device that executes the autonomous enterprise bot is a device or set of devices that process in a cloud processing environment.

In an embodiment, the device that executes the autonomous enterprise bot is the server 110.

In an embodiment, the autonomous enterprise bot the bot 120.

In an embodiment, the autonomous enterprise bot is the all or some combination of the software modules 121-128.

At 210, the autonomous enterprise bot obtains real-time information that includes at least some real-time video data from a facility of an enterprise. That is, real-time video-audio data feeds 112 are fed to the autonomous enterprise bot with real-time operational metrics and status information.

According to an embodiment, at 211, the autonomous enterprise bot obtains the real-time information as device operation and status information for devices of the enterprise, scheduling data for the enterprise (and staff members of the enterprise), and observed customer traffic determined with video tracking/recognition processing 122 from the real-time video data.

At 220, the autonomous enterprise bot determines from the real-time information an activity (a predicted result or desired activity) based on processing the real-time information.

In an embodiment, at 221, the autonomous enterprise bot identifies current facility conditions for the facility from the real-time video data and operational conditions for devices of the enterprise from other portions of the real-time information.

In an embodiment of 221 and at 222, the autonomous enterprise bot provides the facility conditions and operational conditions as input to a machine-learning function and obtains a probability for the activity as a result from the machine-learning function.

In an embodiment of 222 and at 223, the autonomous enterprise bot prioritizes the activity based on other outstanding activities for the enterprise.

In an embodiment of 222 and at 224, the autonomous enterprise bot obtains a list of actions linked to the activity. The actions provided with the communicated activity.

At 230, the autonomous enterprise bot communicates the activity to the enterprise to an enterprise operated device, an IoT device, or a staff device.

According to an embodiment, at 231, the autonomous enterprise bot communicates the activity when a probability associated with the activity exceeds a threshold value.

In an embodiment, at 232, the autonomous enterprise bot communicates the activity when a priority for the activity exceeds outstanding priorities for outstanding activities that are to be communicated to the enterprise.

In an embodiment, at 233, the autonomous enterprise bot communicates the activity through an interactive messaging session with a staff member of the enterprise through an IoT device, enterprise device, and/or staff device.

In an embodiment of 233 and at 234, the autonomous enterprise bot provides the interactive messaging session as one of: a natural language voice-based session, an instant messaging session, and a SMS session.

In an embodiment of 234 and at 240, the autonomous enterprise bot re-assigns the activity from the staff member to a different staff member based on direction of the staff member during the interactive messaging session.

In an embodiment of 240 and at 250, the autonomous enterprise bot sets a reminder to re-communicate the activity to the staff member at a predetermined time that is communicated by the staff member during the interactive messaging session.

Figure 3:
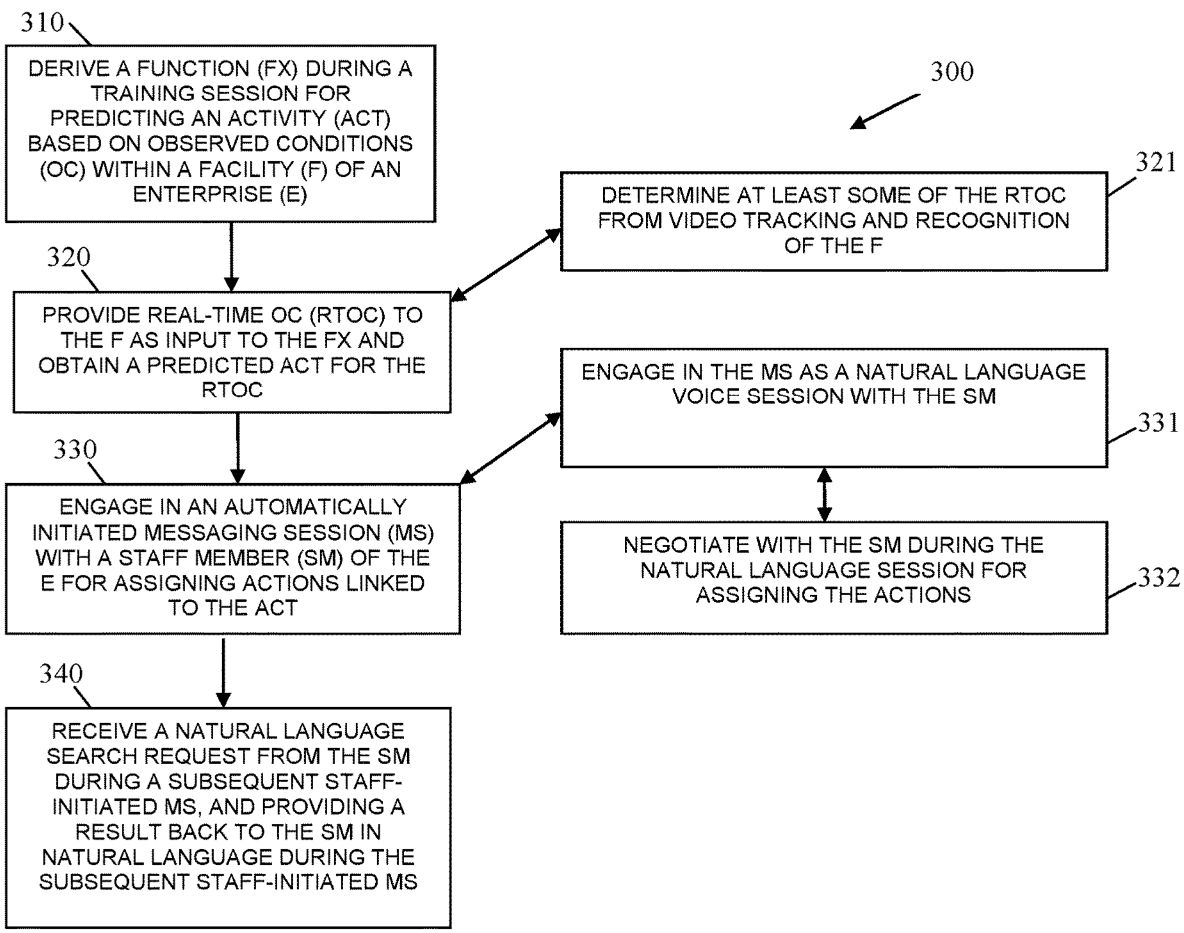
FIG. 3 is a diagram of another method for processing an enterprise bot, according to an example embodiment.

FIG. 3 is a diagram of another method 300 for processing an enterprise bot, according to an example embodiment. The software module(s) that implements the method 300 is referred to as a "management bot." The management bot is implemented as executable instructions programmed and residing within memory and/or a non-transitory computer-readable (processor-readable) storage medium and executed by one or more hardware processors of a hardware computing device. The processors of the device that executes the management bot are specifically configured and programmed to process the management bot. The management bot has access to one or more networks during its processing. The networks can be wired, wireless, or a combination of wired and wireless.

In an embodiment, the device that executes the management bot is a device or set of devices that process in a cloud processing environment.

In an embodiment, the device that executes the management bot is the server 110.

In an embodiment, the management bot is all or some combination of: the bot 120, the modules 121-128, and/or the method 200.

The management bot presents another and in some ways enhanced perspective of the method 200.

At 310, the management bot derives a function during a training session for predicting an activity based on observed conditions within a facility of an enterprise. The derivation of the function can occur with a variety of machine learning techniques, some of which were discussed above with reference to the FIGS. 1A and 1B.

At 320, the management bot provides real-time observed conditions to the function as input to the function and obtain a predicted activity for the real-time observed conditions.

According to an embodiment, at 321, the management bot determines at least some of the real-time observed conditions from video tracking and recognition of the facility (such as 122).

At 330, the management bot engages in an automatically initiated messaging session with a staff member of the enterprise for assigning actions that are linked to the activity.

In an embodiment, at 331, the management bot engages in the messaging session as a natural language voice session with the staff member.

In an embodiment of 331 and at 332, the management bot negotiates with the staff member during the natural language session for assigning the actions.

According to an embodiment, at 340, the management bot receives a natural language search request from the staff member during subsequent staff-initiated messaging sessions. In response, the management bot provides a result back to the staff member in natural language during the subsequent staff-initiated messaging session.

Figure 4:
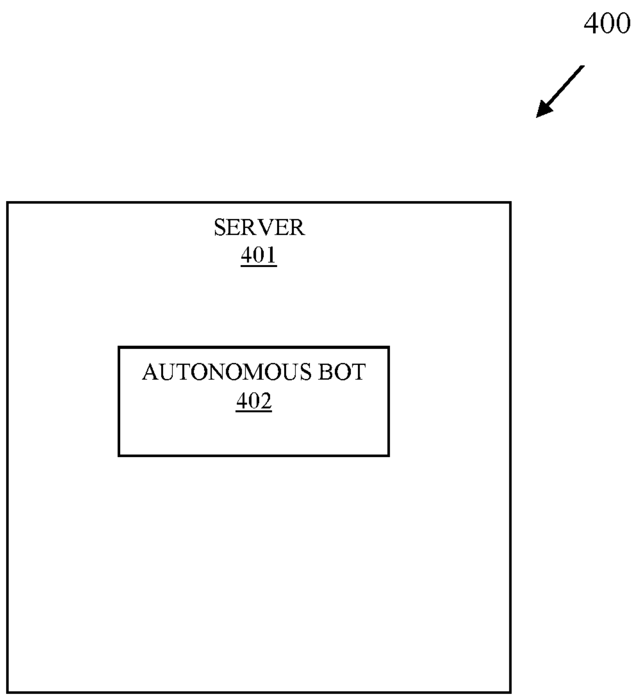
FIG. 4 is a diagram of another system for processing an enterprise bot, according to an example embodiment.

FIG. 4 is a diagram of another system 400 for processing an enterprise bot, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1B and 2-3.

In an embodiment, the system 400 implements, inter alia, the method 200 of the FIG. 2.

In an embodiment, the system 400 implements, inter alia, the method 300 of the FIG. 3.

The system 400 includes a server 401 and the server 401 including an autonomous bot 402.

The autonomous bot 402 is configured to: 1) execute on at least one hardware processor of the server 401, automatically initiate a messaging session with a user based on a determined activity that is predicted to be needed at an enterprise, and (iii) assign the activity during the messaging session with the user.

In an embodiment, the autonomous bot 402 if further configured to: (iv) engaging in subsequent messaging sessions with the user that the user initiates and provide answers to the user in response to user questions identified in the subsequent messaging sessions with respect to the enterprise.

In an embodiment, the autonomous bot 402 is further configured, in (ii), to engage the user in natural language communications during the messaging session.

In an embodiment, the autonomous bot 402 is all or some combination of: the bot 120, the modules 121-128, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

providing executable instructions to a processor of a server from a non-transitory computer-readable storage medium causing the processor to perform operations comprising:

training a machine-learning algorithm on input data and known results observed within an enterprise to configure the machine-learning algorithm to produce as output probabilities of expected results when provided as input real-time information, wherein the input data comprises observed conditions within the enterprise associated with historical tasks of the enterprise along with historical information associated with each historical task, wherein the historical information comprises historical device operational and status information for devices of an enterprise, historical scheduling data for staff of the enterprise, and historical video data of the enterprise representing specific historical customer traffic conditions at the enterprise determined through video tracking and recognition, wherein the known results are desired conditions of the enterprise for each of the historical tasks and provided during the training with each of the corresponding historical tasks, the known results comprise response actions actually taken by the enterprise for any given historical task associated with replenishing media for particular devices in response to any given historical task, scheduling staff in response in response to any given historical task, servicing components of the particular devices in response to any given historical task, adjusting schedules in response to any given historical task, wherein during the training the machine-learning algorithm derives patterns in the observed conditions of the input data for the historical tasks to produce the desired conditions for the known results and derives a function produced by the machine-learning algorithm using machine-learning techniques that when provided new input data outputs probabilities associated with the known results;

obtaining the real-time information that comprises: real-time device operational and status information for the devices of the enterprise, real-time scheduling data for the current staff of the enterprise, the real-time video data depicting current customer traffic at the enterprise by processing the video tracking and recognition, wherein the real-time information is obtained from software systems and data feeds interfaced to the method;

providing the real-time information as input to the machine-learning algorithm and receiving as output a given probability for a current expected result associated with a given desired condition based on the real-time information, wherein the given probability is a highest probability selected from assigned probabilities outputted by machine-learning algorithm for each of the known results, wherein the real-time information is in a same format of the input data used during training of the machine-learning algorithm associated with the historical tasks;

determining from the given probability a particular action that is needed to achieve a given desired condition based on the corresponding known result associated with the highest probability;

communicating the particular action to the enterprise without being asked by the enterprise, wherein the communicating further includes autonomously communicating the particular action as one of a scheduling action to schedule more staff or to adjust an existing schedule, a replenishment action to replenish media of a specified device, a service action to service the specified device, and a service action to service a particular aspect of a facility;

automatically initiating a natural language dialogue with a staff member through a natural language-based interface that receives voice input from a microphone of the enterprise from the staff member based on the communicating of the particular action through the natural language dialogue by processing a speech recognition algorithm that translates text to speech and speech to text during the natural language dialogue;

overriding a need for performing the particular action when the staff member requests an override during the natural-language dialogue and when a security role of the staff member engaged in the natural language dialogue permits an override of the particular action.

2. The method of claim 1, wherein determining further includes identifying facility conditions of the facility from the real-time video data and operational conditions for devices of the enterprise from other portions of the real-time information.

3. The method of claim 1, wherein determining further includes prioritizing the particular action based on other outstanding actions for the enterprise.

4. The method of claim 1, wherein determining further includes obtaining a list of actions linked to the particular action.

5. The method of claim 1, wherein communicating further includes communicating the particular action when the given probability associated with the particular action exceeds a threshold value.

6. The method of claim 1, wherein communicating further includes communicating the particular action when a given priority for the action exceeds outstanding priorities for outstanding actions .

7. The method of claim 1, wherein communicating further includes communicating the particular action through an interactive messaging session with a particular staff member of the enterprise.

8. The method of claim 7, wherein communicating further includes providing the interactive messaging session as one of: a natural language voice-based session, an instant messaging session, and a Short Message Service (SMS) session.

9. The method of claim 8 further comprising, re-assigning the particular action from the particular staff member to a different staff member based on direction of the particular staff member during the interactive messaging session.

10. The method of claim 8 further comprising, setting a reminder to re-communicate the particular action to the particular staff member at a predetermined time that is communicated by the particular staff member during the interactive messaging session.

* * * * *